(12) United States Patent  
Kikuchi

(10) Patent No.: US 8,917,291 B2
(45) Date of Patent: Dec. 23, 2014

(54) PROJECTOR AND CONTROL METHOD

(75) Inventor: Yosuke Kikuchi, Fuchu (JP)

(73) Assignee: Seiko Epson Corporation, Tokyo (JP)

(*) Notice: Subject to any disclaimer, the term of this patent is extended or adjusted under 35 U.S.C. 154(b) by 749 days.

(21) Appl. No.: 13/103,498

(22) Filed: May 9, 2011

(65) Prior Publication Data

US 2011/0279480 A1 Nov. 17, 2011

(30) Foreign Application Priority Data

May 12, 2010 (JP) ................. 2010-110372

(51) Int. Cl.
G09G 5/00 (2006.01)
G09G 3/00 (2006.01)
G06F 3/042 (2006.01)
H04N 9/31 (2006.01)
G09G 5/14 (2006.01)

(52) U.S. Cl.
CPC ............ *G09G 3/002* (2013.01); *G06F 3/0425* (2013.01); *H04N 9/3179* (2013.01); *H04N 9/3194* (2013.01); *G09G 5/14* (2013.01); *G09G 2340/04* (2013.01)
USPC ....................................... 345/660

(58) Field of Classification Search
None
See application file for complete search history.

(56) References Cited

U.S. PATENT DOCUMENTS

| | | | | |
|---|---|---|---|---|
| 5,751,283 A * | 5/1998 | Smith | ........................... | 715/798 |
| 6,204,845 B1 * | 3/2001 | Bates et al. | .................... | 715/788 |
| 6,802,611 B2 * | 10/2004 | Chu et al. | ......................... | 353/28 |
| 2006/0170874 A1 * | 8/2006 | Yumiki et al. | .................. | 353/42 |
| 2008/0249777 A1 * | 10/2008 | Thelen et al. | .................. | 704/270 |
| 2008/0292304 A1 * | 11/2008 | Hirai | ............................ | 396/430 |

FOREIGN PATENT DOCUMENTS

| | | | |
|---|---|---|---|
| JP | A-08-328531 | | 12/1996 |
| JP | 2003173177 A | * | 6/2003 |
| JP | A-2004-078682 | | 3/2004 |
| JP | A-2007-219217 | | 8/2007 |

OTHER PUBLICATIONS

Machine Translation for Japanese Patent JP_2003173177_A, Naoto Hirokawa, Jun. 2003, Projector, and System and Method for Image Distribution.*

* cited by examiner

*Primary Examiner* — Kee M Tung
*Assistant Examiner* — Xin Sheng
(74) *Attorney, Agent, or Firm* — Oliff PLC

(57) ABSTRACT

A projector includes: an image-taking section; an updating section; a storing section storing taken-image information, position data and image data; a projecting section projecting a whole image including an individual image and having a function of adjusting the size of the whole image; and a control section performing control so as to make the projecting section adjust the size of the whole image according to the movement of the individual image in a state in which the whole image includes the whole of the individual image.

10 Claims, 7 Drawing Sheets

PROJECTOR AND CONTROL METHOD

BACKGROUND

1. Technical Field

The present invention relates to projectors and control methods.

2. Related Art

For example, JP-A-2007-219217 describes a method for inputting instruction information showing an enhancing instruction to enhance part of an image, enhancing the part according to an instruction content based on the instruction information, and projecting a zoom image which is an image obtained by enlarging a region including the above part.

However, the above-described method is a method for enlarging part of an image, and the size of the whole image does not change. For example, when the user additionally displays a new individual image in addition to the existing individual image, it is desirable to display the new individual image in an empty space created as a result of the size of the whole image having been enlarged. However, with the above-described method, it is impossible to perform such display.

SUMMARY

An advantage of some aspects of the invention is to provide a projector and a control method which can perform control according to an instruction given to an individual image by solving the problem described above.

A projector according to an aspect of the invention includes a projecting section projecting a whole image including an individual image and having a function of adjusting the size of the whole image; and a control section performing control so as to make the projecting section adjust the size of the whole image according to the movement of the individual image in a state in which the whole image includes the whole of the individual image.

A control method according to another aspect of the invention is directed to a control method in which a computer included in a projector including a projecting section projecting a whole image including an individual image and having a function of adjusting the size of the whole image performs control so as to make the projecting section adjust the size of the whole image according to the movement of the individual image in a state in which the whole image includes the whole of the individual image.

According to the aspects of the invention, the projector can perform control to adjust the size of the whole image according to an instruction for the individual image in a state in which the whole image includes the whole of the individual image.

Furthermore, the projector may include an image-taking section taking an image of a projection target region on which the whole image is projected by the projecting section and generating taken-image information, and the control section may perform control based on the taken-image information. As a result, the projector can perform more versatile control by performing control using the taken-image information.

In addition, the control section may perform control based on instruction information showing an instruction content included in the taken-image information. This allows the projector to perform a greater diversity of control by performing control based on the instruction information.

Moreover, the instruction information may be information showing an instruction light generated as a result of an instructing section emitting light or reflecting light, and, when the instruction light moves multiple times in different directions within a predetermined time and a position to which the instruction light is projected is the position of the individual image, the control section may control the projecting section so as to erase the individual image. This allows the projector to erase the individual image according to an erasing instruction given by using the instruction light.

Furthermore, the individual image may be an image showing the trajectory of the instruction light, and, when the instruction light moves multiple times in different directions within a predetermined time and a position to which the instruction light is projected is the position of the image showing the trajectory, the control section may control the projecting section so as to erase the image showing the trajectory. This allows the projector to erase the image showing the trajectory according to an erasing instruction given by using the instruction light.

In addition, the projector may include a storing section storing position data showing the positions and sizes of the individual image and the whole image; and an updating section updating the position data based on the taken-image information, and the control section may perform control based on the position data. This allows the projector to grasp the positional relationship between the individual image and the whole image easily by using the position data.

Furthermore, the projector may include a transmitting section, and, when an instruction corresponds to a distribution instruction to distribute the individual image, the control section may perform, based on the position data, control so as to make the transmitting section transmit image data of the individual image to a device to which the individual image is distributed. This allows the projector to distribute the image data to the PCs in the conference room or the PCs in remote areas according to the distribution instruction given by using the instruction light or the like and allows the users in remote areas to share the content of the presentation.

In addition, the control section may perform control to adjust the size of the whole image by enlarging and moving an image showing the whole image in a displayable region of an optical modulator included in the projecting section. This allows the projector to adjust the size of the whole image even when the projector does not have a zoom function.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of a projector to which the invention is applied will be described with reference to the drawings. It should be understood that the embodiment described below is not meant to limit the scope of the invention claimed in the appended claims in any way, and all the configurations described in the embodiment are not always necessary for means for solving the problems of the invention claimed in the appended claims.

First Embodiment

Figure 1:
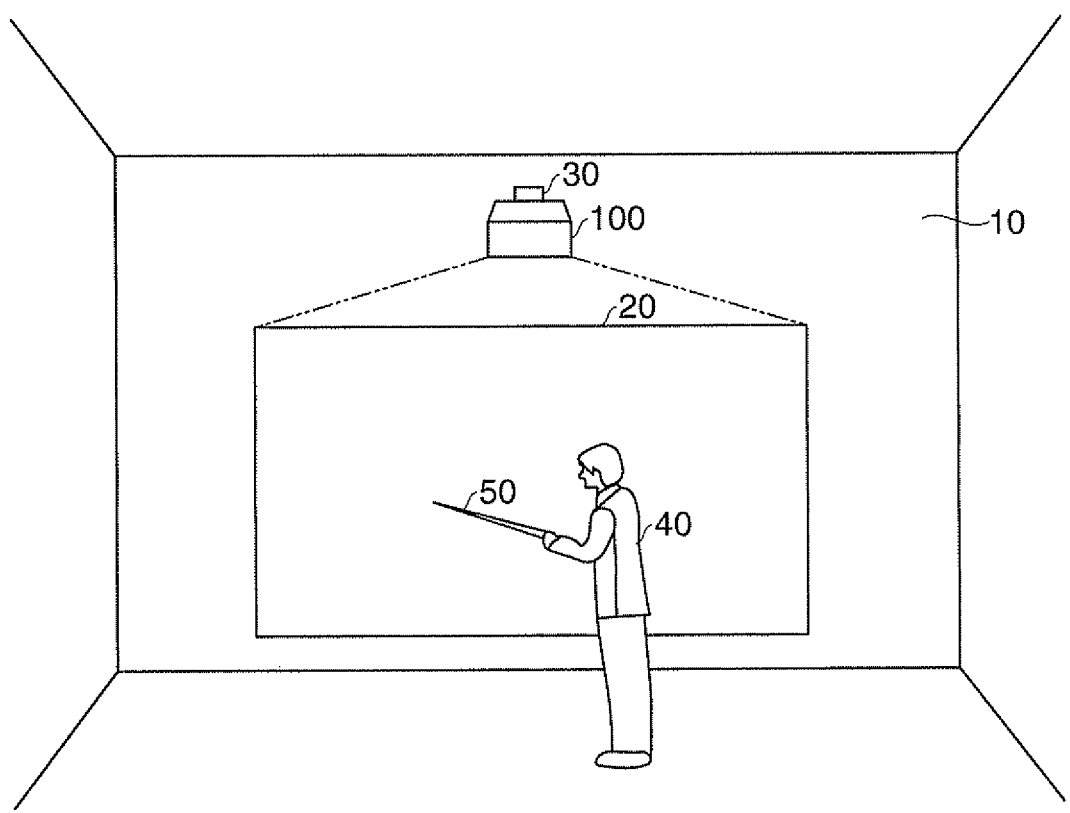
FIG. 1 is a diagram showing an example of a projection status in a first embodiment.

FIG. 1 is a diagram showing an example of a projection status in a first embodiment. For example, in a conference room, a presenter 40 is making a presentation by using an instruction stick 50 which is a type of instruction tool having a light-emitting function. In an upper part of a wall 10 in the conference room, a single focus projector 100 is attached by fittings 30. The projector 100 which is a type of display device is projecting an image 20 onto the wall 10 which is a type of projection target region.

Figure 2:
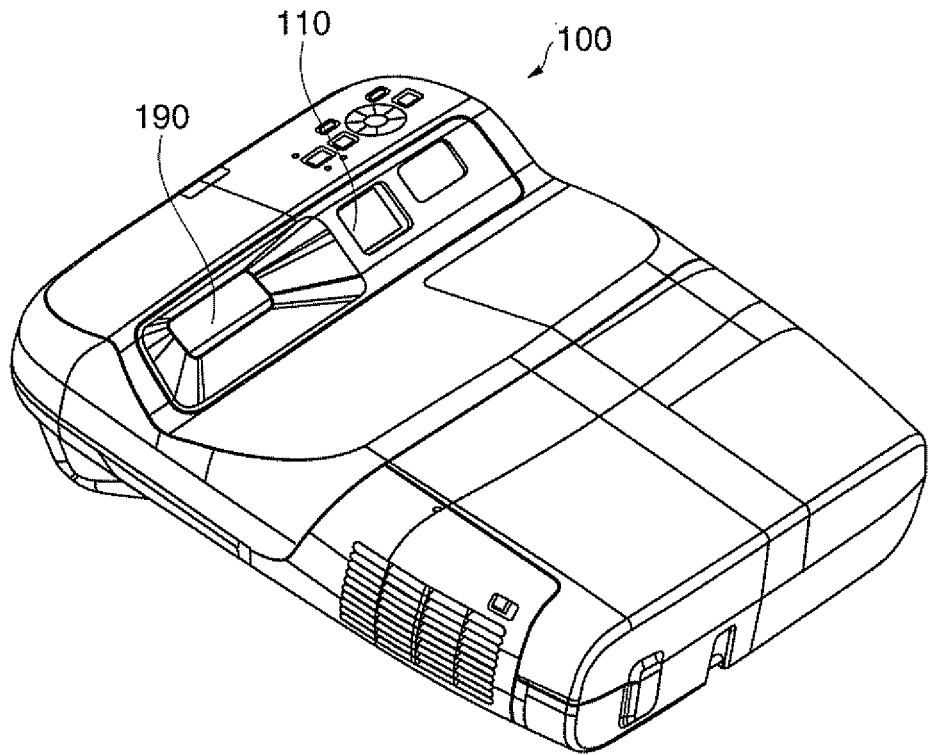
FIG. 2 is an appearance diagram of a projector in the first embodiment.

FIG. 2 is an appearance diagram of the projector 100 in the first embodiment. The projector 100 of FIG. 2 shows a state in which the projector 100 installed in FIG. 1 is turned upside down (a state in which the bottom face of the projector 100 becomes the top face thereof). In an inclined face which faces the wall 10, the inclined face in the bottom face of the projector 100, a projecting section 190 and an image-taking section 110 are provided. This allows the projecting section 190 which is a type of display section to project the image 20 onto the wall 10 and the image-taking section 110 to take an image of the image 20 projected on the wall 10.

Figure 3:
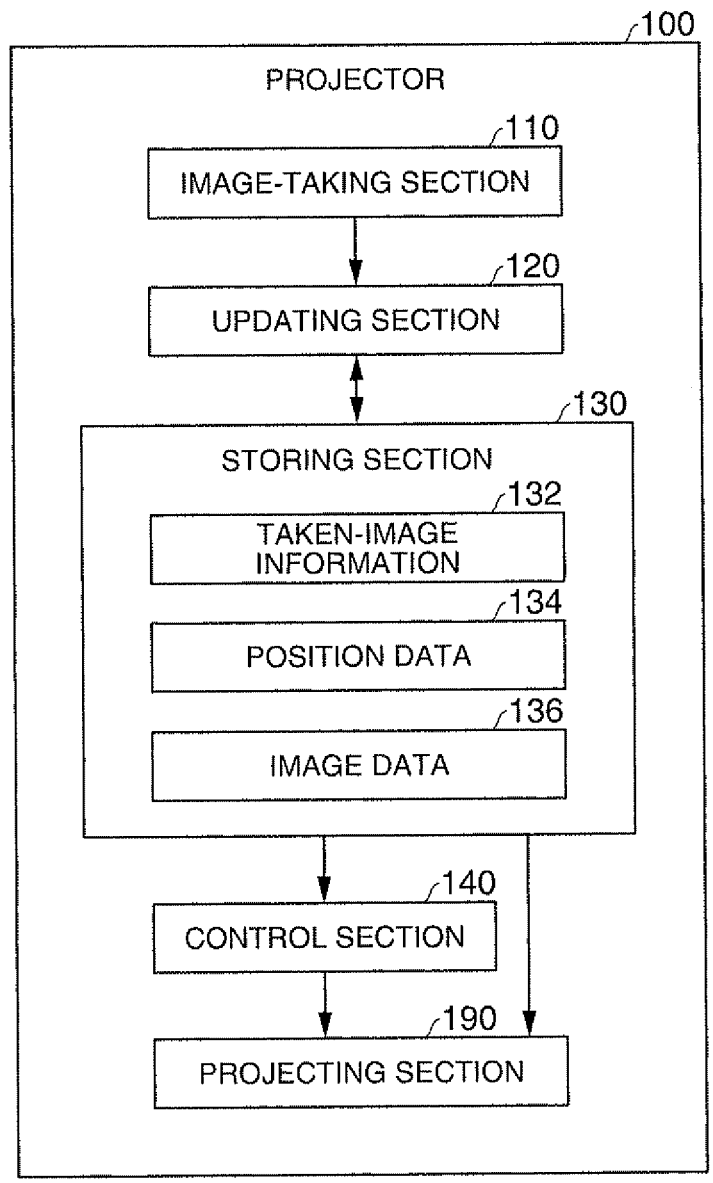
FIG. 3 is a functional block diagram of the projector in the first embodiment.

Next, functional blocks of the projector 100 will be described. FIG. 3 is a functional block diagram of the projector 100 in the first embodiment. The projector 100 includes the image-taking section 110 generating taken-image data showing a taken image, an updating section 120 storing the taken-image data in a storing section 130 as taken-image information 132, the storing section 130 storing the taken-image information 132, position data 134, image data 136, and the like, the projecting section 190 projecting the image 20, and a control section 140 controlling the projecting section 190 based on the taken-image information 132 and the like. Incidentally, the position data 134 is data showing the positions and sizes of an individual image and a whole image which are included in the image 20, and the image data 136 is data showing the content of the individual image or the like.

Figure 4:
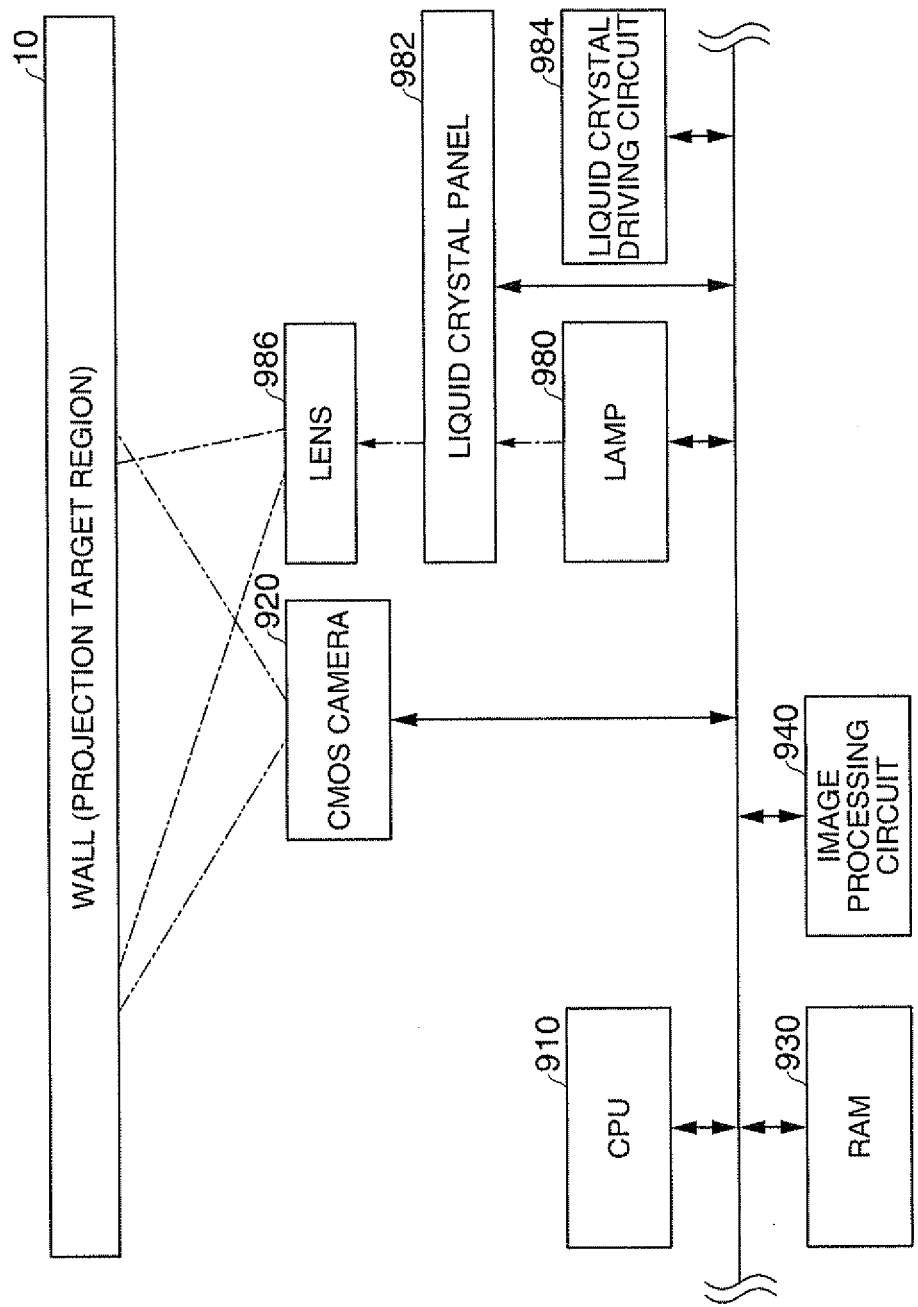
FIG. 4 is a hardware block diagram of the projector in the first embodiment.

Moreover, the projector 100 may function as each of these sections by using the following hardware. FIG. 4 is a hardware block diagram of the projector 100 in the first embodiment. For example, the projector 100 may use a CMOS camera 920 or the like as the image-taking section 110, a CPU 910 or the like as the updating section 120 and the control section 140, RAM 930 or the like as the storing section 130, and an image processing circuit 940, a lamp 980, a liquid crystal panel 982, a liquid crystal driving circuit 984, a lens 986, and the like as the projecting section 190.

Figure 5:
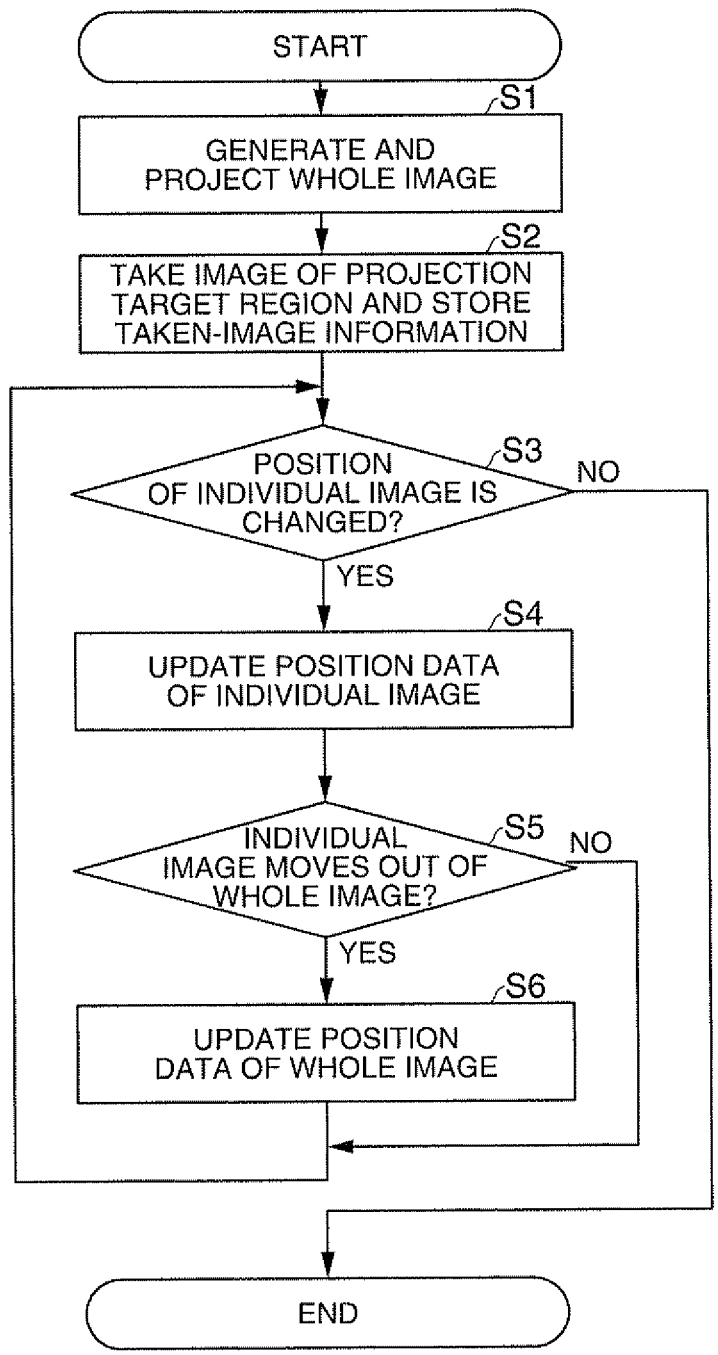
FIG. 5 is a flowchart showing a projection procedure in the first embodiment.

Next, a projection procedure by which the image 20 is projected in this embodiment will be described. FIG. 5 is a flowchart showing the projection procedure in the first embodiment. The presenter 40 gives a projection start instruction to start projection of the image 20 by pressing the tip (an instructing section) of the instruction stick 50, the tip from which light is being emitted, against the wall 10 in an image-taking range of the image-taking section 110 for a few seconds. The image-taking section 110 takes an image of the wall 10 at all times in a state in which the power of the projector 100 is on, and the updating section 120 stores the taken-image data from the image-taking section 110 in the storing section 130 as the taken-image information 132. The control section 140 determines whether or not a projection start instruction to start projection of the image 20 is given based on the taken-image information 132. If the projection start instruction to start projection of the image 20 is given, the control section 140 makes the projecting section 190 start projection of the image 20. More specifically, the projecting section 190 generates a whole image 210 in an initial state based on the control information showing the projection start instruction, the control information from the control section 140, and projects the whole image 210 (step S1). The image-taking section 110 takes an image of the projection target region, and the updating section 120 stores the taken-image information 132 in the storing section 130 (step S2).

Figure 6:
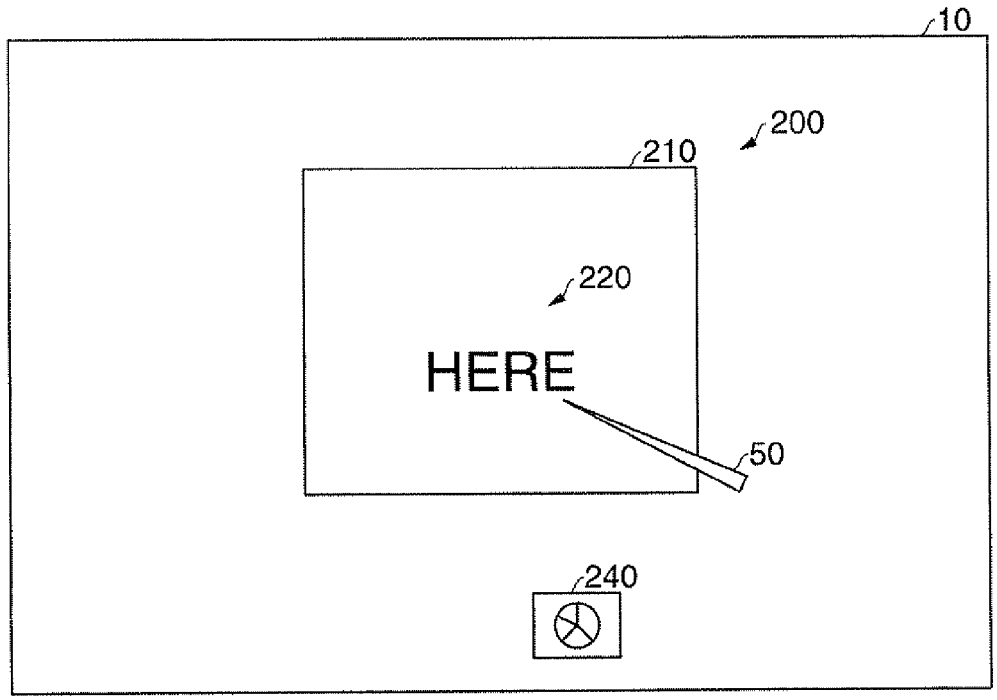
FIG. 6 is a diagram showing an example of an image in the first embodiment.

FIG. 6 is a diagram showing an example of an image 200 in the first embodiment. For example, when image information is input to the projector 100 via an HDMI terminal, a USB terminal, a PC terminal, or the like, the projecting section 190 projects an image 240 which is a reduced-size image based on the image information below the whole image 210. Moreover, when a character or the like is written by using the instruction stick 50 in the whole image 210 projected on the wall 10, the updating section 120 stores, based on the taken-image information 132, the position data 134 showing the position of the writing and the image data 136 showing the image of the writing in the storing section 130, and the projecting section 190 projects, based on the position data 134, the image data 136, and the like, the whole image 210 including an individual image 220 showing the trajectory of the writing as part of the image 200.

Figure 7:
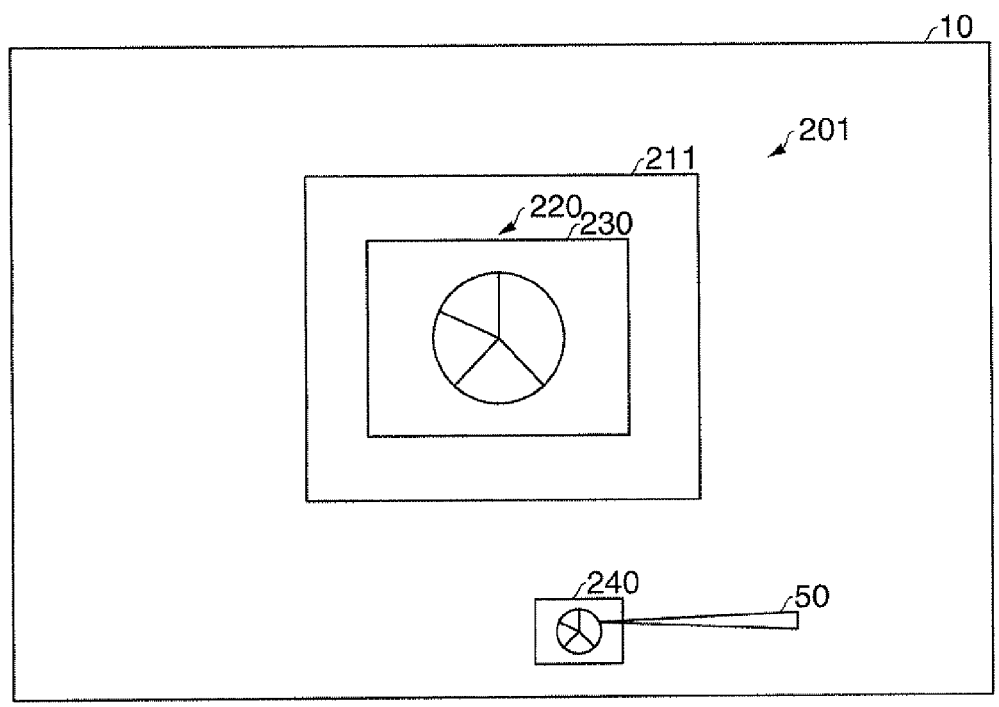
FIG. 7 is a diagram showing another example of an image in the first embodiment.

Moreover, when the tip of the instruction stick 50 is stopped in the position of the image 240 for a few seconds, the control section 140 performs control so as to make the projecting section 190 project an individual image corresponding to the image 240. FIG. 7 is a diagram showing another example of an image 201 in the first embodiment. For example, in the image 201, an individual image 230 corresponding to the image 240 is projected in the center front face of the whole image 211. In this case, when the individual image 220 is present, the individual image 230 is placed on the individual image 220 and makes the individual image 220 invisible. Incidentally, based on the taken-image information 132 etc., the updating section 120 updates the position data 134 according to the addition or movement of the individual images 220 and 230 or the movement of the whole images 210 and 211.

Figure 8:
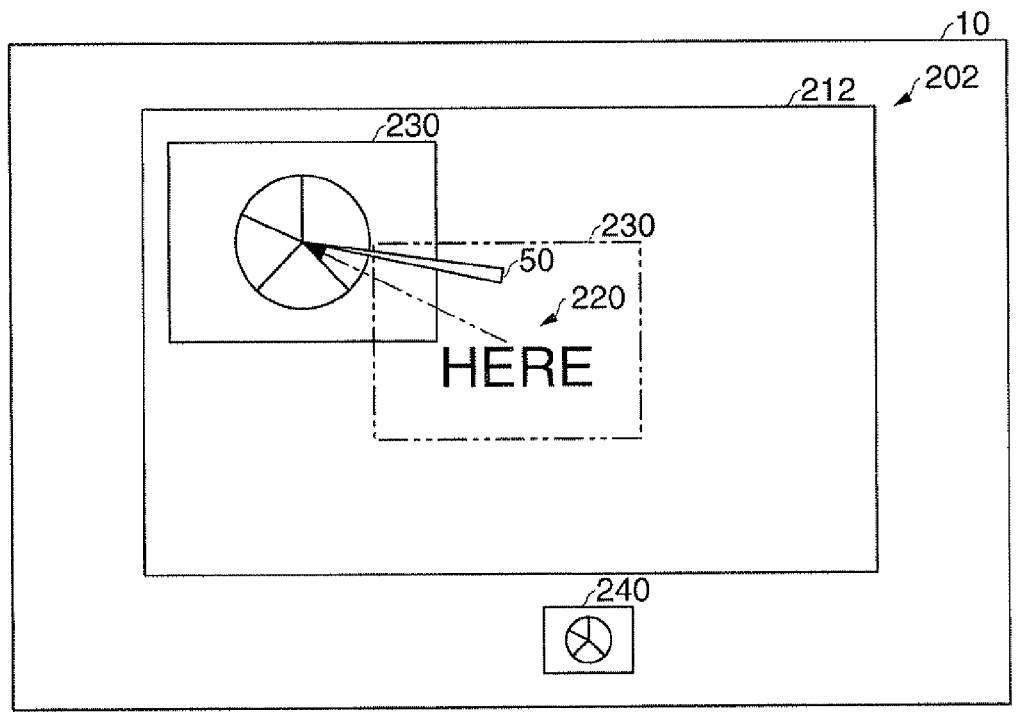
FIG. 8 is a diagram showing another example of an image in the first embodiment.

FIG. 8 is a diagram showing another example of an image 202 in the first embodiment. For example, the presenter 40 stops the tip of the instruction stick 50 in the position of the individual image 230 for a few seconds and then moves the tip of the instruction stick 50. Based on the taken-image information 132, the updating section 120 updates the position data 134 showing the position of the individual image 230 according to the position change instruction which changes the position of the individual image 230 (step S4). Moreover, based on the position data 134 showing the position of the individual image 230 and the position data 134 showing the position of the whole image 212, the updating section 120 determines whether or not the individual image 230 moves out of the whole image 212 as a result of the movement of the individual image 230 (step S5). When the individual image 230 moves out of the whole image 212, the updating section 120 updates the position data 134 of the whole image 212 according to the movement of the individual image 230 (step S6). As a result, when the individual image 230 moves to the outside, the projecting section 190 can project the image 202 which enlarges the whole image 212 according to the movement.

Incidentally, when the individual image 230 moves to the inside, the projecting section 190 may project an image which reduces the size of the whole image 212 according to the movement. Moreover, a method for projecting an image which enlarges the whole images 210 to 212 may be, for example, a method by which the projecting section 190 adjusts, according to the control, the sizes of the whole images 210 to 212 by enlarging and moving the images showing the whole images 210 to 212 in a displayable region of an optical modulator (for example, the liquid crystal panel 982) included in the projecting section 190.

As described above, according to this embodiment, the projector 100 can perform control so as to adjust the sizes of the whole images 210 to 212 according to an instruction for the individual images 220 and 230 in a state in which the whole images 210 to 212 include the whole of the individual images 220 and 230. Moreover, according to this embodiment, the projector 100 can perform versatile and diversified control by performing control using the instruction light of the instruction stick 50 or the taken-image information 132. Furthermore, since the projector 100 can adjust the sizes of the whole images 210 to 212 and the positions of the individual images 220 and 230 according to the movement of the instruction stick 50, the projector 100 can ensure a region for writing and eliminate overlapping of the individual images 220 and 230 and thereby enhance convenience for the presenter 40.

Moreover, according to this embodiment, the presenter 40 can make a presentation by using only the instruction stick 50 without using a PC (personal computer), a whiteboard, or the like. In addition, since the presenter 40 can display not only the individual image 230 showing an input image but also the handwritten individual image 220 in one image, it is possible to enhance the effectiveness of the presentation. Furthermore, unlike the whiteboard, the region in which the individual images 220 and 230 are displayed is not fixed, and the presenter 40 can enlarge the region by moving the instruction stick 50. This makes it possible to display more information and enhance the effectiveness of the presentation. In addition, according to this embodiment, the projector 100 can adjust the sizes of the whole images 210 to 212 by enlarging and moving the image in the optical modulator even when the projector 100 does not have a zoom function.

OTHER EMBODIMENTS

Figure 9:
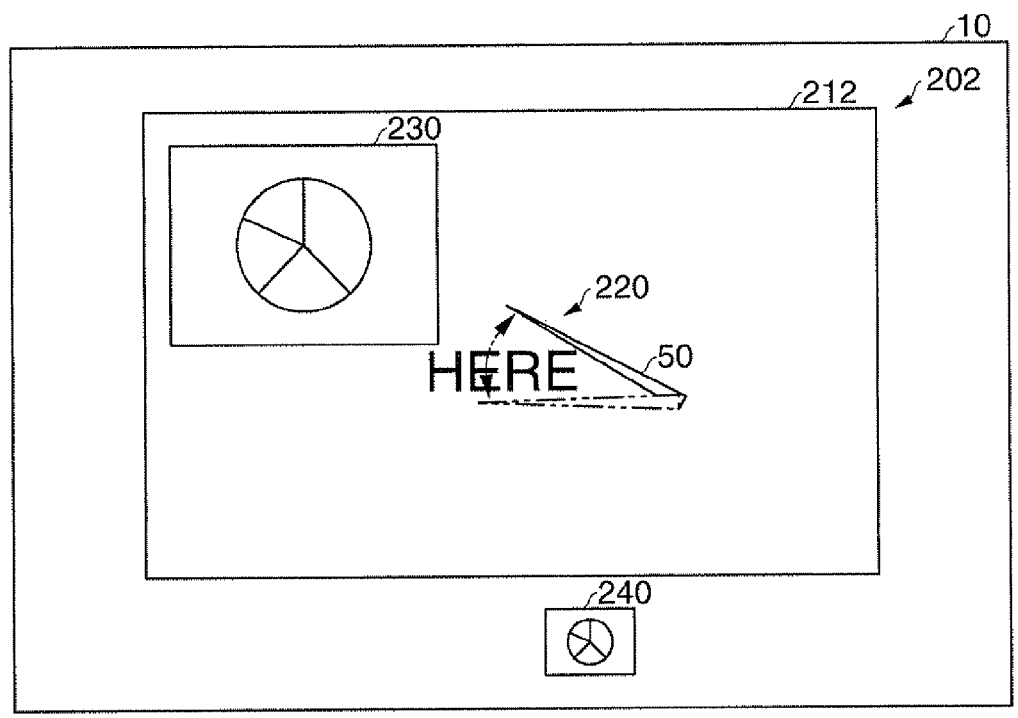
FIG. 9 is a diagram showing an example of an image in another embodiment.
Figure 10:
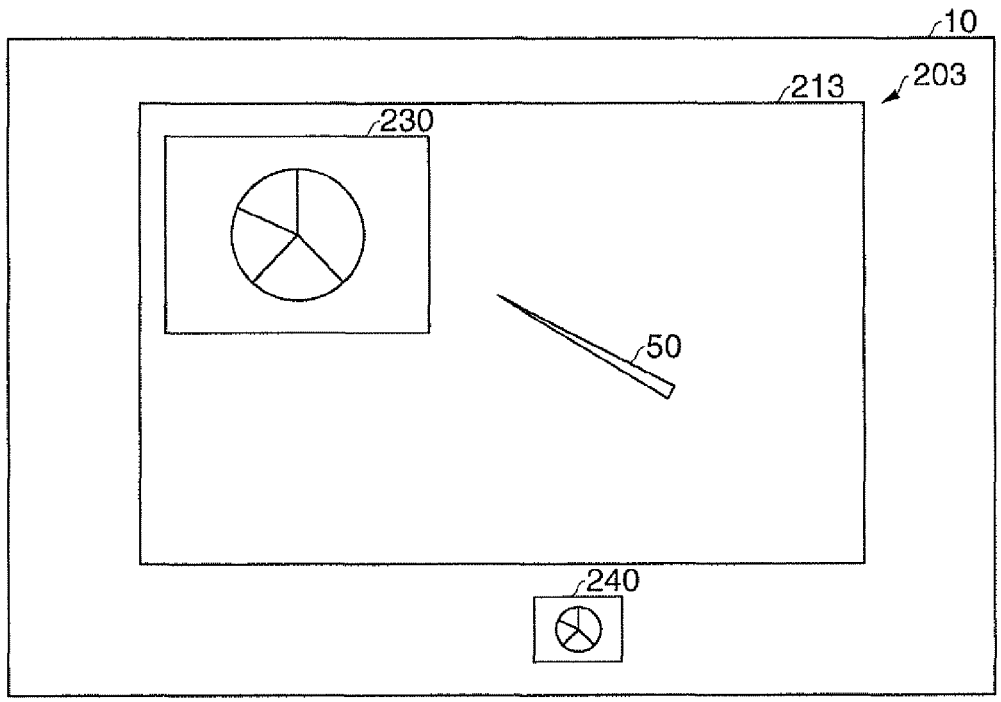
FIG. 10 is a diagram showing another example of an image in the other embodiment.

Incidentally, the application of the invention is not limited to the embodiment described above, and modifications are possible. For example, the control section 140 may perform control to erase the individual images 220 and 230 according to the trajectory of the instruction light. FIG. 9 is a diagram showing an example of the image 202 in another embodiment. Moreover, FIG. 10 is a diagram showing another example of an image 203 in the other embodiment. For example, the presenter 40 erases the individual image 220 by placing the tip of the instruction stick 50 in the position of the individual image 220 in a state in which the image 202 including the individual image 220 is being projected and then, within 5 seconds after placing the tip of the instruction stick 50 in the position of the individual image 220, moving the instruction stick 50 up and down two or more times. Specifically, for example, the control section 140 determines whether or not the movement of the instruction light of the instruction stick 50 corresponds to an erasing instruction based on the position data 134. If the movement of the instruction light of the instruction stick 50 corresponds to an erasing instruction, the control section 140 controls the projecting section 190 so as to erase the individual image 220. Based on the control information from the control section 140, the projecting section 190 projects the image 203 including a whole image 213 from which the individual image 220 is erased. In this way, the projector 100 can erase the individual image 220 showing the trajectory and the individual image 230 showing the input image according to the erasing instruction given by using the instruction light.

Figure 11:
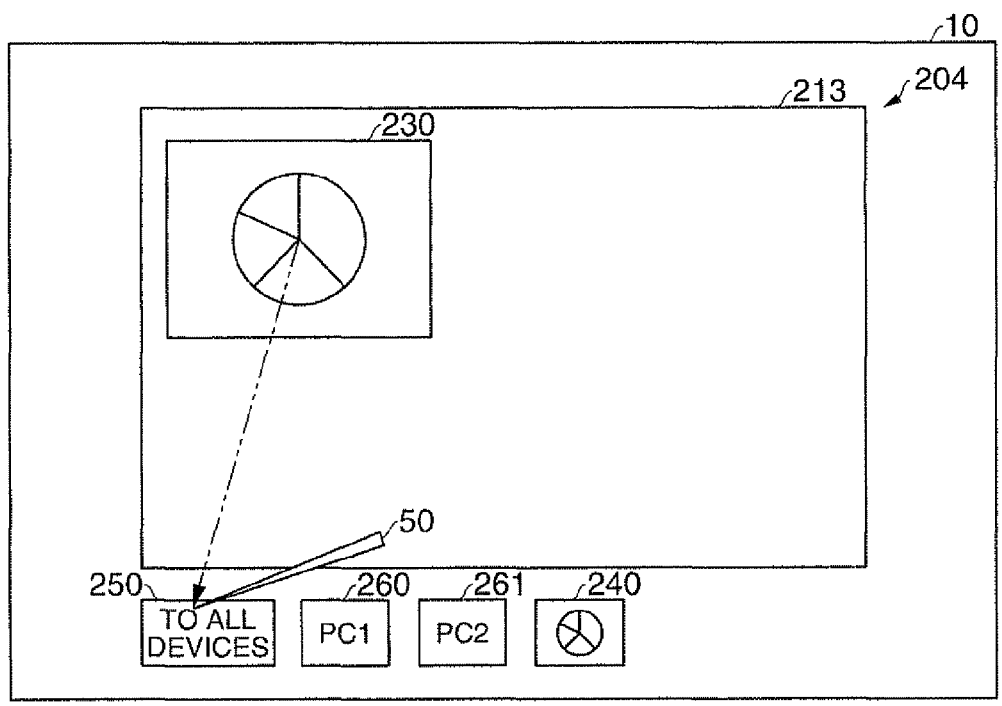
FIG. 11 is a diagram showing another example of an image in still another embodiment.

Moreover, when the projector 100 has a communication section, the control section 140 may perform control, for example, so as to make the communication section transmit the image data 136 of the individual image 230 to an external device according to an instruction for the individual image 230 showing the input image. FIG. 11 is a diagram showing another example of an image 204 in still another embodiment. The image 204 includes the whole image 213 including the individual image 230, an image 250 instructing to distribute the image data to all the devices, an image 260 instructing to distribute the image data to PC1, an image 261 instructing to distribute the image data to PC2, and the image 240 corresponding to the individual image 230.

For example, the presenter 40 copies, from the projector 100, the image data 136 of the individual image 230 and makes PC1 and PC2 store the image data 136 by placing the tip of the instruction stick 50 in the position of the individual image 230 in a state in which the image 204 including the individual image 230 is being projected, then, within 3 seconds after placing the tip of the instruction stick 50 in the position of the individual image 230, moving the instruction stick 50 up and down two times, and moving the tip of the instruction stick 50 from the individual image 230 to the image 250. Specifically, for example, the control section 140 determines whether or not the movement of the instruction light of the instruction stick 50 corresponds to a copy instruction (a distribution instruction) based on the position data 134. If the movement of the instruction light of the instruction stick 50 corresponds to a copy instruction, the control section 140 controls the communication section (the transmitting section) so as to copy the image data 136 of the individual image 230. The communication section transmits the image data 136 of the individual image 230 to a target device based on the control information from the control section 140.

As a result, the projector 100 can distribute the image data 136 to the PCs in the conference room or the PCs in remote areas according to the copy instruction given by using the instruction light and allow the users in remote areas to share the content of the presentation. Moreover, since the projector 100 can determine whether an instruction is an instruction to enlarge the whole image 213 or a copy instruction according to the instruction content given by the instruction stick 50 before movement, it is possible to enhance convenience for the presenter 40. Furthermore, since the presenter 40 can distribute not only the image data of the input image but also the image data showing the content of writing, it is possible to distribute the minutes of the conference or the like to the PCs of intended users.

Moreover, in this case, the control section 140 may notify the presenter 40 that the image data 136 can be moved or copied by making the individual image 230 flash when the instruction stick 50 is moved up and down two times within 3 seconds after the tip of the instruction stick 50 is placed in the position of the individual image 230. Furthermore, the control section 140 may perform control to erase the individual image 230 when the instruction stick 50 is moved up and down in the position of the individual image 230 in a state in which the individual image 230 is made to flash.

Moreover, in the embodiment described above, the control section 140 adjusts the sizes of the whole images 210 to 213 according to the movement of the individual images 220 and 230; however, the control section 140 may adjust the sizes of the whole images 210 to 213 according to the movement of the instruction light from the instruction stick 50. In addition, the projecting section 190 may adjust the size of the whole image 210 by image processing without changing the size of the image 200 or adjust the size of the whole image 210 by changing the size of the image 200 by adjusting the zoom lens.

Furthermore, the projection target region is not limited to the wall 10 and may be, for example, a screen, a whiteboard, a blackboard, a window, or a column. The projection target region may be a three-dimensional space between the projectors 100 and 101 and an object on which projection is performed. Moreover, when the projection target region is formed of different materials such as a window, a column, and the like, the projecting section 190 may project an image by adjusting the color or brightness according to the materials based on the taken-image information 132. In addition, the instruction tool is not limited to the instruction stick 50 and may be, for example, an instruction stick having an instructing section such as a light-emitting section or a reflecting section (for example, aluminum foil or a mirror), a remote control (a remote controller) having a light-emitting function, a light pointer, a mouse having a light-emitting function, a highlighter, or a marker. More specifically, when a pen, an instruction stick, or the like whose reflecting section is usually hidden and is exposed only while a button is being pressed is used, a high-brightness region is formed in the taken image by the light reflected from the reflecting section. This allows the projector 100 to grasp the instruction content such as an instruction position based on the high-brightness region. Moreover, for example, the projecting section 190 may detect the instruction position by detecting the pressure exerted by the instruction tool in the projection target region, detecting the position of the instruction tool included in the taken image, or detecting the instruction position (the position in which the light is projected) indicated by a laser pointer with the image-taking section 110. In addition, the projecting section 190 may grasp the instruction content based on, for example, the position of a finger included in the taken image in addition to the instruction position indicated by the instructing section.

Moreover, the computer of the projector 100 may function as the image generating section 180 etc. by reading a program product stored in an information storage medium. As such an information storage medium, a CD-ROM, a DVD-ROM, ROM, RAM, an HDD, and the like can be applied.

Furthermore, the projector 100 is not limited to a single focus projector. In addition, the projector 100 is not limited to a liquid crystal projector (a transmissive liquid crystal projector, a reflective liquid crystal projector such as LCOS) and may be, for example, a projector using a digital micromirror device. Moreover, the projecting section 190 may adopt, in place of a lamp, an organic EL device, a silicon light-emitting device, and a self light-emitting device including a solid light source such as a laser diode or an LED. In addition, the function of the projector 100 may be distributed among a plurality of devices (for example, a PC and a projector).

The entire disclosure of Japanese Patent Application No. 2010-110372, filed May 12, 2010 is expressly incorporated by reference herein.

What is claimed is:

1. A projector comprising:
    a projecting section projecting a whole image including an individual image and having a function of adjusting the size of the whole image, the whole image being configured to be projected on a screen;
    an image taking section taking an image of the screen;
    an updating section detecting a position change instruction based on the image taken by the image taking section, and updating position data which shows a position of the individual image according to the position change instruction; and
    a control section performing control so as to make the projecting section adjust the size of the projected whole image according to the position data in a state in which the whole image includes a whole of the individual image,
    wherein the control section determines whether or not the individual image moves out of the whole image according to the position data and enlarges the size of the whole image when the individual image moves out of the whole image.

2. The projector according to claim 1,
    wherein the image taking section takes an image of a projection target region on which the whole image is projected by the projecting section and generates taken-image information, and
    the control section performs control based on the taken-image information.

3. The projector according to claim 2, wherein
    the control section performs control based on instruction information showing an instruction content included in the taken-image information.

4. The projector according to claim 3, wherein
    the instruction information is information showing an instruction light generated as a result of an instructing section emitting light or reflecting light, and
    when the instruction light moves multiple times in different directions within a predetermined time and a position to which the instruction light is projected is the position of the individual image, the control section controls the projecting section so as to erase the individual image.

5. The projector according to claim 4, wherein
    the individual image is an image showing the trajectory of the instruction light, and
    when the instruction light moves multiple times in different directions within a predetermined time and a position to which the instruction light is projected is the position of the image showing the trajectory, the control section controls the projecting section so as to erase the image showing the trajectory.

6. The projector according to claim 1, comprising:
    a storing section storing the position data showing the positions and sizes of the individual image and the whole image;
    wherein the updating section updates the position data based on taken-image information generated by the image taking section, and
    the control section performs control based on the position data.

7. The projector according to claim 6, comprising:
    a transmitting section, wherein when an instruction corresponds to a distribution instruction to distribute the individual image, the control section performs, based on the position data, control so as to make the transmitting section transmit image data of the individual image to a device to which the individual image is distributed.

8. The projector according to claim 1, wherein the control section performs control to adjust the size of the whole image by enlarging and moving an image showing the whole image in a displayable region of an optical modulator included in the projecting section.

9. A control method performed by a projector, comprising:

projecting a whole image including an individual image, the whole image being configured to be projected on a screen, the step being performed by a projecting section of the projector;

taking an image of the screen, the step being performed by an image taking section of the projector;

detecting a position change instruction based on the image taken by the image taking step, and updating position data which shows a position of the individual image according to the position change instruction, the step being performed by an updating section of the projector; and adjusting the size of the projected whole image according to the position data in a state in which the whole image includes a whole of the individual image, the step being performed by a control section of the projector, and determining whether or not the individual image moves out of the whole image according to the position data and enlarging the size of the whole image when the individual image moves out of the whole image, the step being performed by the control section of the projector.

10. The projector according to claim 1, wherein:

the control section performs control based on instruction information, the instruction information being information showing an instruction light generated as a result of an instructing section emitting light or reflecting light, when the instruction light moves multiple times in different directions within a predetermined time and a position to which the instruction light is projected is the position of the individual image, the control section controls the projecting section so as to flash the individual image, and when the instruction light moves further multiple times within a predetermined time, the control section controls the projecting section so as to erase the flashed individual image.

* * * * *